Sept. 29, 1959 P. M. BOURDON 2,906,315
MOUNTINGS FOR TUBELESS PNEUMATIC TIRES ON VEHICLE WHEELS
Filed Feb. 17, 1955
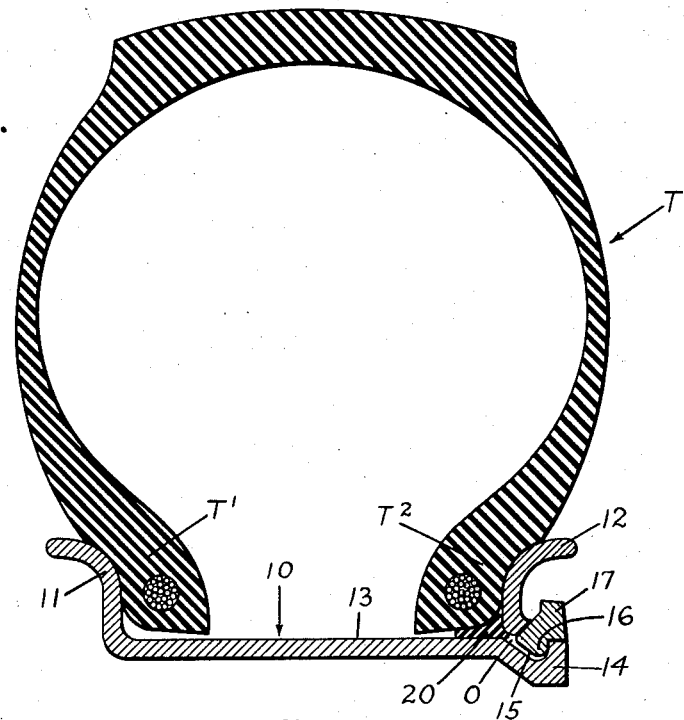
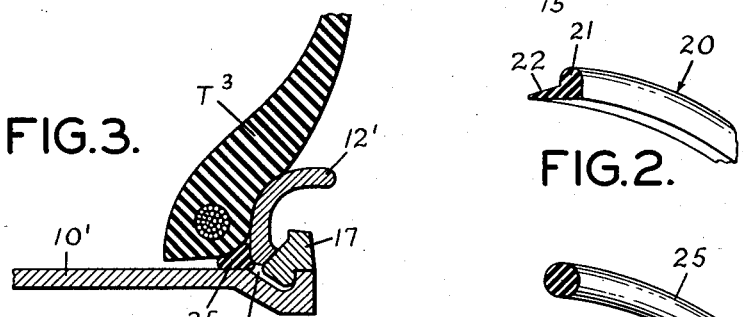
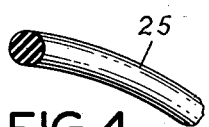
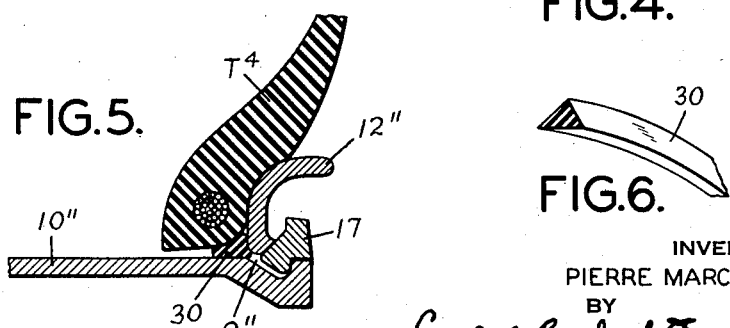
INVENTOR
PIERRE MARCEL BOURDON
BY
HIS ATTORNEYS

2,906,315
MOUNTINGS FOR TUBELESS PNEUMATIC TIRES ON VEHICLE WHEELS

Pierre Marcel Bourdon, Paris, France, assignor to Compagnie Generale des Etablissements Michelin, Clermont-Ferrand, France Application February 17, 1955, Serial No. 488,947
Claims priority, application France February 26, 1954
3 Claims. (Cl. 152—410)

This invention relates to improvements in pneumatic tire vehicle wheels and it relates particularly to improved means for mounting tubeless tires on the rims of vehicle wheels of the type having a removable rim flange.

Recent developments in pneumatic tire vehicle wheels have now provided means by which tubeless tires can be successfully mounted on the rims of existing or new vehicle wheels. I have found that if the flanges are both integral with the base of the rim no special sealing surfaces or ring seals around the beads of tubeless tires are necessary for a leakproof engagement with the rim flanges and it is possible to obtain an effective and essentially leakproof relation between the tire and the rim only with carefully made conventional beads and flanges.

The problem of adapting tubeless tires to wheel rims arises only with rims which have a removable flange. Even with precision control and fitting of the removable flange to the rim, gaps or passages are inevitably present and thus will allow leakage of air from between the tire and the rim.

The present invention contemplates the suppression of every special sealing means relating to the fixed flanges or flange of the rim and means for only sealing the gaps or passages between the removable flange if any, and the rim. I have found that by providing a resilient or deformable ring-like packing which engages the outer surface of the rim, the inner surface of the removable flange and the bead of the tire in engagement with the removable flange, an effective seal is provided between them. The pressure of the air in the tire causes deformation of the packing thereby forcing it into intimate engagement with all of the above-mentioned surfaces and spanning and plugging any and all passages or gaps between them through which air might escape. More particularly, the packing or ring may be formed of a resilient and deformable rubbery material such as natural or synthetic rubber and it may be made in any of a number of different shapes, for example, wedge or triangular, circular or polygonal, so long as it can be deformed into sealing engagement with the adjacent surfaces of the rim, the removable flange and the tire bead by the air pressure in the tire. Packings or rings of suitable size and shape seal even large gaps between the removable flange and the rim effectively and thus facilitate the use of tubeless tires with rims of the removable flange type.

For a better understanding of the present invention, reference may be had to the accompanying drawings in which:

Fig. 1 is a view in cross-section through one side of a rim of a wheel and through a tubeless tire mounted thereon;

Fig. 2 is a view in cross-section and perspective of a portion of a sealing ring or packing of the type used for sealing the tire to the rim as shown in Fig. 1;

Fig. 3 is a view in cross-section through a portion of a rim having a removable flange thereon and through the bead of a tubeless tire illustrating a modified form of the invention;

Fig. 4 is a view in cross-section and perspective of a portion of the packing or ring used in the modification disclosed in Fig. 3;

Fig. 5 is a view in section through a portion of the rim and a portion of a tire illustrating a further modification of a sealing ring embodying the present invention; and Fig. 6 is a view in cross-section and perspective of a portion of the sealing ring or packing used in the modification shown in Fig. 5.

The invention will be described with respect to certain selected embodiments of the invention in conjunction with wheel rims having a detachable or removable rim flange that is held in position be means of a split retaining ring.

Fig. 1 discloses a section of a wheel rim 10 of the kind indicated having a fixed integral rim flange 11 at one edge and a removable rim flange 12 at its other edge. The rim flange 12 is a continuous annular ring of sufficient internal diameter to be slidable upon the base or outer surface 13 of the rim 10. The latter has an inwardly offset retaining portion 14 provided with an outwardly facing groove 15 in which is engaged a bead or rib 16 on the retaining ring 17 which holds the removable flange 12 in position. The ring 17 is split so that it can be sprung apart and then snapped into position with the bead 16 thereon engaging in the groove 15 in the rim thereby firmly anchoring the removable flange 12 in place.

With rims of the type described, a gap or opening O is always present between the rim flange 12 and the rim 10, even when these parts are fitted together within manufacturing tolerances. Due to the presence of the gap or opening O, a tubeless tire T of the type shown in Fig. 1, cannot be used with the rim even though the beads $T^1$ and $T^2$ of the tire are in airtight relation to the rim flanges 11 and 12.

The present invention provides an effective means for sealing the rim flange 12 to the base surface 13 of the rim 10 and thereby preventing leakage of air through the gap or opening O. As shown in Figs. 1 and 2, the sealing means may consist of a continuous packing 20 of ring-like form having a generally wedge-shaped cross-section provided by a raised bead 21 and a lip 22 having inclined upper surface thereon, as shown in Fig. 2.

When a deflated tire T is placed on the rim 10, the bead $T^1$ will engage the fixed rim flange 11. The lip 22 of the packing ring 20 will then be inserted between the surface 13 and the bead $T^2$ of the tire and the removable flange 12 is placed on the rim in engagement with the bead 21 of the packing ring 20. The retaining ring 17 is then snapped in place and air is introduced into the tire T through the valve mounted in the rim (not shown). The rim 10 being set vertically during the mounting with the flange 11 at the bottom, the weight of the tire ensures a provisional tightness between flange 11 and bead $T^1$ whereas the lip 22 ensures said provisional tightness between rim 10 and bead $T^2$. The pressure of the air can increase and forces the beads $T^1$ and $T^2$ tightly against the rim flanges 11 and 12 and also forces the packing ring 20 against the bead $T^2$ tightly. The packing ring 20, in turn, is forced outwardly by the air pressure in the tire into the corner formed by the adjoining surfaces of the flange 12 and the rim 10. The air pressure deforms the ring 20 so that it conforms to the surfaces of the flange 12 and rim 10 and covers the opening or passage O between the flange 12, the rim 10 and extension 14 thereby providing an airtight seal. The ring 20 is formed of a readily deformable material, such as a soft synthetic or natural rubber, or a resilient plastic. The packing should be more readily deformable than the rubber of the tire so that it can be forced into sealing engagement with the tire, rim and flange by air pressures on the order of 15 to 20 pounds per square inch.

While a packing ring of the cross-sectional area indicated is most advantageous because of the manner in which it conforms to the surfaces with which it is in contact and because it can be applied to tires for which the distance between the flanges 11 and 12 is greater than the distance between the beads T¹, T² at rest on the deflated tire, other types of packing rings may be used, as shown in Figs. 3 to 6. But these packing rings having no lip such as 22, can only be used with tires for which the distance between the flanges 11, 12 is less than the distance between the beads T¹, T² at rest on the deflated tire. Thus, a packing ring 25 of circular cross-section and having the physical characteristics set forth above may be used to close the gap O' between the rim 10' and the removable flange 12'. As indicated best in Fig. 3, the pressure of the air in the casing urging the bead T³ into contact with the flange 12' will deform the packing rim 25 to a generally wedge or triangular shape, fitting within the generally triangular area between the rim 10', the rim flange 12' and the bead T³ and sealing the gap O' against leakage.

Figs. 5 and 6 disclose the use of a packing ring 30 of triangular cross-section for providing a seal between the bead T⁴, the rim 10" and the removable flange 12". Less distortion takes place in a triangular or wedge-shaped packing ring of the kind disclosed because it more nearly conforms initially to the shape of the gap between the three elements to be sealed by the packing ring.

It will be understood that the packing ring may have other cross-sectional shapes, for example, egg, oval or polygonal, such as trapezoidal and the like, so long as it conforms generally to or can be deformed to fit tightly in the gap between the rim, its removable rim flange and the cooperating bead of the tire.

From the preceding description of typical embodiments of the invention, it will be apparent that a sealing means has been provided which is effective to prevent leakage between a tubeless tire and a vehicle wheel rim of the kind having a removable flange.

The present invention also provides means whereby the tubeless tire may be readily mounted on the rim and inflated. The packing ring forms a seal between the bead of the tire, the outer surface of the rim and the inner surface of the removable rim flange even when the latter is not seated tightly against the retaining ring therefor, so that air can be introduced into the tire to partially inflate it even before all the parts are firmly seated against each other.

It will be observed that, in contradistinction with what has been proposed up to now, the invention provides no special seals symmetrically disposed on both beads.

According to the invention a single annular seal is necessary only (a) If one of the flanges is removable (b) On the side of of the rim where this flange is fitted (c) Between the external angle of the bead seated against said removable flange and the angle formed by said flange and the rim.

I have discovered that in other cases no special sealing means are necessary.

My invention results in a considerable saving of costs and avoids the use of special tires which are complicated and costly. Moreover the packing ring can, in each case, be formed as to have a more closed fit.

It will be understood that the present invention is adaptable to all sizes of rims and tubeless tires therefor and that the shape and size of the packing ring can be varied in accordance with the requirements of d'fferent tires and rims. Accordingly, inasmuch as the present invention is susceptible to considerable modification, the forms of the invention described above should be considered as illustrative.

I claim:

1. A tire and rim assembly comprising a continuous wheel rim of the flat base type having a circumferential flange at one edge for engaging the bead of a tire, a tubeless tire mounted on said rim with a radial clearance, said tire having continuous, rim-engaging beads thereon, one of which is in sealing engagement with said flange, a removable continuous circumferential flange on said rim adjacent to the other edge, means detachably retaining said continuous, removable flange on said rim, a removable and deformable, separately assembled, continuous packing ring between a bead of said tire, the removable flange and said rim, said packing ring comprising a transverse cross section in the approximate shape of a right triangle whose approximately right angle is between said rim and said removable flange and whose hypotenuse is longer than the curature of said tire bead such that said hypotenuse is between said rim and said tire bead to prevent the escape of air between said rim and said tire bead.

2. A tire and rim assembly comprising a wheel rim of the flat base type having a circumferential flange at one edge for engaging the bead of a tire, a tubeless tire mounted on said rim with a radial clearance, said tire having continuous, rim-engaging beads thereon, one of which is in sealing engagement with said flange, a removable, continuous, circumferential flange on said rim adjacent to its other edge, means detachably retaining said removable flange on said rim, the pressure of said tire urging the other bead of said tire into direct contact with the removable, continuous flange to provide a seal therebetween, as well as to prevent relative movement therebetween, and a removable, continuous, deformable separately assembled packing ring engaging said continuous rim, said removable, continuous flange and said other bead forming a seal therebetween.

3. A tire and rim assembly comprising a continuous wheel rim of the flat base type having an outer surface and a fixed circumferential flange adjacent to one edge thereof, a tubeless tire mounted on said rim with a radial clearance and having continuous rim-engaging beads thereon, one of said beads being in sealing engagement with said fixed rim flange, a removable, continuous rim flange on said rim adjacent to its other edge and having an inner surface disposed at an angle to said outer surface of the rim to form a circumferential corner therewith, said removable, continuous rim flange engaging the other bead of said tire under pressure when the tire is inflated to maintain a sealing engagement and to prevent relative movement therebetween, and a removable, continuous, deformable, separately assembled packing ring disposed in said corner and engaging said other bead, the outer surface of said rim and the inner surface of said removable rim flange to form a seal therebetween, said packing ring being so positioned that said other bead exerts a force on said packing ring along an axis which is oblique to the axis of revolution of said wheel, the air pressure in the tire deforming the packing ring to produce a triple wedge, one in the direction of the contacting surfaces of the bead and the removable flange, one between the removable flange and the rim, and one between the bead and the rim.

References Cited in the file of this patent
UNITED STATES PATENTS

| 2,563,787 | Keefe | Aug. 7, 1951 |
| 2,685,907 | Waddell | Aug. 10, 1954 |
| 2,822,017 | Herzegh | Feb. 4, 1958 |

FOREIGN PATENTS

| 305,533 | Great Britain | Oct. 10, 1929 |
| 150,936 | Australia | Apr. 17, 1953 |
| 523,758 | Belgium | Nov. 14, 1953 |

(Corresponding English language duplicate)

| 725,767 | Great Britain | Mar. 9, 1955 |